United States Patent
Chachmon et al.

(10) Patent No.: US 12,166,696 B2
(45) Date of Patent: Dec. 10, 2024

(54) QUASI-OUTPUT QUEUE BEHAVIOR OF A PACKET SWITCHING DEVICE ACHIEVED USING VIRTUAL OUTPUT QUEUE ORDERING INDEPENDENTLY DETERMINED FOR EACH OUTPUT QUEUE

(71) Applicant: Cisco Technology, Inc., San Jose, CA (US)

(72) Inventors: Nadav Chachmon, Moshav Yaad (IL); Ofer Iny, Tel Aviv (IL); Aviram Yeruchami, Kefar Sava (IL)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/317,805

(22) Filed: May 15, 2023

(65) Prior Publication Data
US 2023/0283577 A1     Sep. 7, 2023

Related U.S. Application Data

(63) Continuation of application No. 17/303,136, filed on May 20, 2021, now Pat. No. 11,683,276.

(51) Int. Cl.
*H04L 49/90* (2022.01)
*H04L 47/62* (2022.01)

(52) U.S. Cl.
CPC .............. *H04L 49/90* (2013.01); *H04L 47/62* (2013.01)

(58) Field of Classification Search
CPC ................................ H04L 49/90; H04L 47/62
See application file for complete search history.

(56) References Cited

U.S. PATENT DOCUMENTS

| | | |
|---|---|---|
| 6,351,466 B1 | 2/2002 | Prabhakar et al. |
| 6,654,342 B1 | 11/2003 | Dittia et al. |
| 6,674,721 B1 | 1/2004 | Dittia et al. |

(Continued)

OTHER PUBLICATIONS

International Preliminary Report on Patentability for International Application No. PCT/US2022/030087, mailed Nov. 30, 2023, 13 Pages.

(Continued)

*Primary Examiner* — Siming Liu
(74) *Attorney, Agent, or Firm* — Polsinelli P.C.

(57) ABSTRACT

In one embodiment, quasi-Output Queue behavior of a packet switching device is achieved using virtual output queue (VOQ) ordering independently determined for each particular output queue (OQ), including using maintained latency information of the VOQs of the particular OQ. In one embodiment, all packets from all VOQs with a same port-priority destination experience similar latency within specific time-window, which is similar to the packet service provided by an Output Queue switch architecture. In one embodiment, all input ports that send traffic to same output port-priority receive bandwidth which is proportional to their bandwidth demand divided by total bandwidth. Prior approaches that emulate the performance of an OQ switch architecture require complex and time-consuming scheduling determinations and do not scale. Independently determining the order for sending packets from the VOQs associated with each particular OQ provides a scalable and implementable system with quasi-Output Queue behavior.

20 Claims, 10 Drawing Sheets

(56) References Cited

U.S. PATENT DOCUMENTS

| | | | |
|---|---|---|---|
| 6,697,382 | B1 | 2/2004 | Eatherton |
| 6,788,689 | B1 | 9/2004 | Turner et al. |
| 6,816,492 | B1 | 11/2004 | Turner et al. |
| 6,907,041 | B1 | 6/2005 | Turner et al. |
| 7,061,927 | B2 | 6/2006 | Panigrahy et al. |
| 7,184,443 | B2 | 2/2007 | Bonomi et al. |
| 7,391,786 | B1 | 6/2008 | Prasad et al. |
| 7,583,678 | B1 | 9/2009 | Levy et al. |
| 7,599,381 | B2 | 10/2009 | Shoham et al. |
| 7,602,720 | B2 | 10/2009 | Bergamasco et al. |
| 7,809,009 | B2 | 10/2010 | Tatar et al. |
| 7,876,763 | B2 | 1/2011 | Cohen et al. |
| 8,077,618 | B2 | 12/2011 | Klapper et al. |
| 8,199,764 | B2 | 6/2012 | Hoffman et al. |
| 8,467,294 | B2 | 6/2013 | Raman et al. |
| 8,817,807 | B2 | 8/2014 | Suzuki et al. |
| 9,100,313 | B1 | 8/2015 | Mazzola et al. |
| 9,503,396 | B2 | 11/2016 | Shoham et al. |
| 10,122,645 | B2 | 11/2018 | Acharya et al. |
| 10,715,455 | B2 | 7/2020 | Williams, Jr. et al. |
| 10,721,187 | B1 | 7/2020 | Goldman et al. |
| 10,735,339 | B1 * | 8/2020 | Matthews ............... H04L 47/56 |
| 2014/0161135 | A1 * | 6/2014 | Acharya ............ H04L 47/6255 370/412 |
| 2018/0278550 | A1 | 9/2018 | Rosen et al. |

OTHER PUBLICATIONS

Firoozshahian et al., "Efficient, fully local algorithms for CIOQ switches," IEEE INFOCOM 2007—26th IEEE International Conference on Computer Communications, 2007, pp. 2491-2495, IEEE Society, Piscataway, NJ (five pages).

Shang-Tse Chuang et al., "Matching Output Queueing with a Combined Input/Output-Queued Switch," IEEE Journal on Selected Areas in Communications, Jun. 1999, pp. 1030-1039, vol. 17, No. 6, IEEE Society, Piscataway, NJ (ten pages).

Spang et al., "Buffer Sizing and Video QoE Measurements at Nefflix," BS '19: Proceedings of the 2019 Workshop pn Buffer Sizing, Dec. 2019, pp. 1-7, Article No. 6, Association for Computing Machinery, New York, NY (seven pages).

R. Schoenen and R. Hying, "Distributed Cell Scheduling Algorithms for Virtual-Output-Queued Switches," Seamless Interconnection for Universal Services, GLOBECOM'99—Global Telecommunications Conference, 1999, pp. 1211-1215, vol. 2, IEEE Society, Piscataway, NJ (five pages).

Danilewicz et al., "Packet Switch Architecture with Multiple Output Queueing," GLOBECOM '04—IEEE Global Telecommunications Conference, 2004, pp. 1192-1196, vol. 2, IEEE Society, Piscataway, NJ (five pages).

Hyoung-Il Lee and Seung-Woo Seo, "Matching Output Queueing with a Multiple Input/Output-Queued Switch," EEE/ACM Transactions on Networking, Feb. 2006, pp. 121-132, vol. 14, No. 1, IEEE Society, Piscataway, NJ (twelve pages).

* cited by examiner

QUASI-OUTPUT QUEUE BEHAVIOR OF A PACKET SWITCHING DEVICE ACHIEVED USING VIRTUAL OUTPUT QUEUE ORDERING INDEPENDENTLY DETERMINED FOR EACH OUTPUT QUEUE

CROSS-REFERENCE TO RELATED APPLICATION

This application is a continuation of U.S. Non-Provisional patent application Ser. No. 17/303,136, filed on May 20, 2021, the disclosure of which is hereby expressly incorporated by reference in its entirety.

TECHNICAL FIELD

The present disclosure relates generally to communicating packets within a packet switching device using virtual output queues at an ingress stage with a virtual output scheduler independently determining a requesting order of virtual output queues independently for each of one or more output queues at an egress stage.

BACKGROUND

Packet switching devices have been implemented using different architectures. An Output Queue (OQ) switch architecture provides a predictable and well-understood packet scheduling order. Essentially each packet is submitted to its destination output queue upon arrival from an input port and scheduled from the output queue based on its priority towards the output port. However, an OQ architecture is not scalable because it requires each output queue to be able to absorb packets from all its source input ports in potentially very high rate. In addressing the scalability issue, Virtual Output Queue (VOQ) packet switching architectures were introduced. The VOQ architecture submits packets into VOQs located in the ingress side of a switching matrix and transfers the packets to an output queue located on the egress side (i.e., close to the output port). However, various scheduling algorithms for determining packet transfers between VOQs and OQs provide different results, and those that emulate the performance of a OQ switch architecture require complex and time-consuming scheduling calculations and operations, and does not scale especially as packet transmission and receiving rates increase.

BRIEF DESCRIPTION OF THE DRAWINGS

The appended claims set forth the features of one or more embodiments with particularity. The embodiment(s), together with its advantages, may be understood from the following detailed description taken in conjunction with the accompanying drawings of which:

DESCRIPTION OF EXAMPLE EMBODIMENTS

1. Overview

Figure 1A:
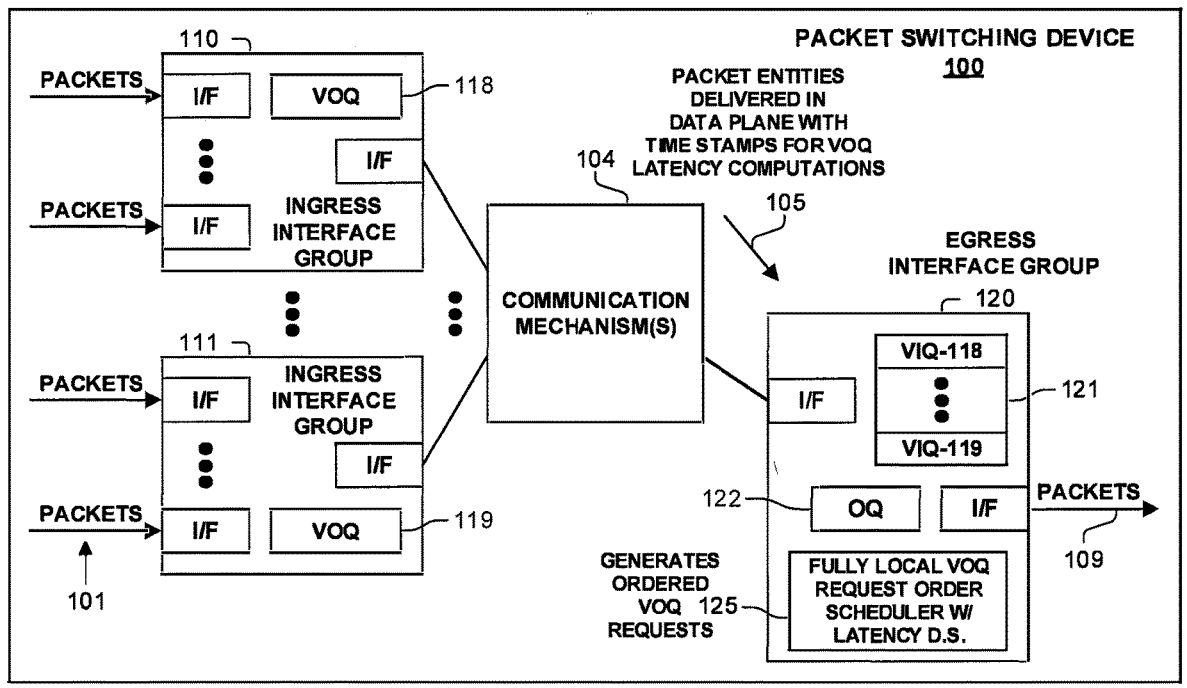
FIG. 1A illustrates a packet switching device according to one embodiment.

Disclosed are, inter alia, methods, apparatus, computer-storage media, mechanisms, and means associated with achieving quasi-Output Queue behavior of a packet switching device using virtual output queue ordering independently determined for each output queue.

An apparatus (e.g., packet switching device) of one embodiment includes: an egress interface group including a plurality of output queues, one or more virtual output queue (VOQ) schedulers, and one or more VOQ latency data structures stored in memory; a plurality of ingress interface groups, with each particular ingress interface group of the plurality of ingress interface groups including for each particular output queue of the plurality of output queues, a particular virtual output queue (VOQ) storing packet entities for packets received by particular ingress interface group for said particular output queue, with said received packets being sent from the apparatus based on corresponding dequeuing orders from the plurality of output queues; and one or more communication mechanisms providing data path communications between each of ingress interface groups and the egress interface group, including communicating, to the egress interface group, said packet entities dequeued from said VOQs as identified by next VOQ identifiers determined by said VOQ schedulers. In one embodiment, each specific output queue of the plurality of output queues, said VOQ schedulers repeatedly determine a specific next VOQ identifier for said specific output queue and maintains latency information of said VOQs of said specific output queue in said VOQ latency data structures independent of maintained latency information of VOQs of other of said output queues. In one embodiment, each of said VOQs and said output queues is a first-in-first-out (FIFO) queue.

In one embodiment, a plurality of specific packet entities of said communicated packet entities includes an associated time value; and wherein said VOQ latency data structures are updated based on said communicated associated time values. In one embodiment, each specific packet entity of said communicated packet entities includes a specific packet descriptor or specific packet of said received packets that is enqueued in a corresponding output queue of said output queues. In one embodiment, said communicated associated time values identify times of enqueuing corresponding packet entities in said VOQs or identify times of receiving corresponding packets by the apparatus.

In one embodiment, said VOQ schedulers maintain a first-in-first-out (FIFO) queue for each of the plurality of output queues, with entries of said FIFO queue for an identifiable output queue including VOQ identifiers for each non-empty VOQ associated with the identifiable output queue, with each of said next VOQ identifier determined for said identifiable output queue being a first VOQ identifier a head of the identifiable output queue, with the first VOQ identifier either being located at the head of the specific output queue or a tail of the specific output queue in response to an adaptive decision based on said maintained latency information of said VOQs of said identifiable output queue. In one embodiment, the adaptive decision includes determining, based on said maintained latency information, whether the first VOQ identifier identifies a particular VOQ having a longest latency of said VOQs associated with said identifiable output queue. In one embodiment, the adaptive decision includes limiting a number of times that the first VOQ identifier remains at the head of said identifiable output queue before being moved to the tail of the specific output queue. In one embodiment, the adaptive decision is based on said maintained latency information of said VOQs associated with the identifiable specific output queue and a random value.

In one embodiment, each particular next VOQ identifier of said next VOQ identifiers is determined, based on a random value, from non-empty said VOQs of a corresponding output queue of the plurality of output queues. In one embodiment, each of a plurality of said particular next VOQ identifiers has a longest latency of said non-empty said VOQs and is selected based on a weighted value and the random value, with the weighted value determined based on the longest latency and a shortest latency identified in said maintained latency information of said non-empty VOQs of the corresponding output queue. In one embodiment, each of a plurality of said particular next VOQ identifiers does not have a longest latency of said non-empty said VOQs and is selected based on a weighted value and the random value, with the weighted value determined based on the longest latency and a shortest latency identified in said maintained latency information of said non-empty VOQs of the corresponding output queue.

One embodiment includes a method, comprising: maintaining a virtual output queue (VOQ) for each different ingress path of a plurality of ingress paths, with each of said VOQs being associated with an output queue; for each particular packet of a plurality of packets received on a particular ingress path of said ingress paths, enqueuing an encapsulating entity in a particular VOQ of said VOQs for the particular ingress path for said particular packet, with the encapsulating entity including a particular packet entity for said particular packet and a time stamp; for each of a plurality of internal communication cycles and responsive to a VOQ request identifying a specific VOQ that is generated by a VOQ scheduler, dequeuing a specific encapsulating entity from the specific VOQ with the specific encapsulating entity including a specific packet entity and a specific time stamp, and after communicating the specific encapsulating packet entity over one or more communication mechanisms the specific packet entity is enqueued in the output queue and a VOQ latency data structure is maintained based on the specific time stamp; and forwarding packets over an egress path from the output queue based on an order of dequeued packet entities from the output queue. In one embodiment, the VOQ scheduler maintains latency information of said VOQs in the VOQ latency data structure independent of maintained latency information of other VOQs of other output queues.

In one embodiment, each of the plurality of packets said received on a particular ingress path are stored in a shared memory system; wherein each of said specific packet entities includes a packet descriptor; and wherein the method includes retrieving a corresponding one of said received packets from the shared memory system based on the packet descriptor. In one embodiment, said retrieving the corresponding one of said received packets from the shared memory system is performed in response to dequeuing a specific packet entity from the output queue, with the specific packet entity including the packet descriptor.

In one embodiment, the VOQ scheduler maintains a first-in-first-out (FIFO) queue with entries including VOQ identifiers for each non-empty VOQ associated with the output queue. In one embodiment, after the VOQ scheduler determines the specific VOQ from a first VOQ identifier currently at a head of the FIFO queue, the first VOQ identifier is located at the head or a tail of the FIFO queue in response to an adaptive decision by the VOQ scheduler based on current latency information associated with said VOQs of the output queue.

In one embodiment, the VOQ scheduler determines the specific VOQ based on current latency information of said VOQs and a random value, with one of said VOQs having a longest latency being selected as the specific VOQ in response to a first result of an ordering decision based on a weighted value and a random value, and randomly selecting one of said VOQs in response to a second result of the ordering decision. In one embodiment, the weighted value is determined based on the longest latency and a shortest latency identified in the VOQ latency data structure.

An apparatus (e.g., packet switching device) of one embodiment includes: a plurality of egress interface groups, with each particular egress interface group of the plurality of egress interface groups including a plurality of output queues, a virtual output queue (VOQ) scheduler, and one or more VOQ latency data structures stored in memory; a plurality of ingress interface groups, with each particular ingress interface group of the plurality of ingress interface groups including for each particular output queue of the plurality of output queues of the plurality of said egress interface groups, a particular VOQ storing corresponding packet entities, with each of said packet entities including a time stamp and a packet descriptor of a corresponding packet received by said particular ingress interface group; a communication mechanism communicatively coupling each of said ingress interface groups with each of said egress interface groups, including selectively communicating packet entities from said ingress interface groups to said egress interface groups; wherein each of said egress interface groups, responsive to a received packet entity, maintains latency information in corresponding said VOQ latency data structures based on the time stamp of the received packet entity and enqueues the packet descriptor of the received packet entity in a corresponding output queue of said output queues; and a shared packet memory system communicatively coupled to each of said ingress interface groups and said egress interface groups, with each of said ingress interface groups storing packets in the shared packet memory system, and with each of said egress interface groups retrieving said packets from the shared memory system based on corresponding packet descriptors. In one embodiment, the VOQ scheduler determines next VOQ identifiers of VOQs for each of said output queues on a same egress interface group of said egress interface groups independently of other output queues on the same egress interface group, with an order of said selectively communicated packet entities being identified from said determined next VOQ identifiers.

In one embodiment, said specific VOQ scheduler of each specific egress interface group of the plurality of egress interface groups maintains for each specific output queue of said output queues on said specific egress interface group, a first-in-first-out (FIFO) queue with entries including a VOQ identifier for each non-empty VOQ associated with said specific output queue, and with said specific VOQ scheduler determining said next VOQ identifiers from a first VOQ identifier at a head of the corresponding FIFO queue and adaptively either leaving the first VOQ identifier at the head or moving to a tail of the corresponding FIFO queue based on current latency information associated with said VOQs of said specific output queue.

In one embodiment, said specific VOQ scheduler of each specific egress interface group of the plurality of egress interface groups determines each particular next VOQ identifier for each specific output queue of said output queues on said specific egress interface group based on current latency information of the non-empty VOQs associated with said specific output queue and a random value, and with said particular next VOQ identifier being a non-empty VOQ having a longest latency of the non-empty VOQs associated with said specific output queue in response to a first result of an ordering decision based on a weighted value and the random value, and randomly selecting one of the non-empty VOQs associated with said specific output queue in response to a second result of the ordering decision.

2. Description

Disclosed are, inter alia, methods, apparatus, computer-storage media, mechanisms, and associated with achieving quasi-Output Queue behavior of a packet switching device using virtual output queue ordering independently determined for each output queue.

As used herein, "forwarding information" includes, but is not limited to, information describing how to process (e.g., forward, send, manipulate, modify, change, drop, copy, duplicate, receive) corresponding packets. In one embodiment, determining forwarding information is performed via an ingress lookup operation and an egress lookup operation. Also, the term "processing" when referring to processing of a packet process refers to a broad scope of operations performed in response to a packet, such as, but not limited to, forwarding/sending, dropping, manipulating/modifying/changing, receiving, duplicating, creating, applying one or more service or application functions to the packet or to the packet switching device (e.g., updating information), etc. Also, as used herein, the term processing in "parallel" is used in the general sense that at least a portion of two or more operations are performed overlapping in time. The term "interface," expansively used herein, includes the interface infrastructure (e.g., buffers, memory locations, forwarding and/or other data structures, processing instructions) that is used by a network node in performing processing related to packets. Further, as used herein, a "virtual interface," in contrast to a "physical interface," is an interface that does not directly connect to an external cable or other communications mechanism.

As described herein, embodiments include various elements and limitations, with no one element or limitation contemplated as being a critical element or limitation. Each of the claims individually recites an aspect of the embodiment in its entirety. Moreover, some embodiments described may include, but are not limited to, inter alia, systems, networks, integrated circuit chips, embedded processors, ASICs, methods, and computer-readable media containing instructions. One or multiple systems, devices, components, etc., may comprise one or more embodiments, which may include some elements or limitations of a claim being performed by the same or different systems, devices, components, etc. A processing element may be a general processor, task-specific processor, a core of one or more processors, or other co-located, resource-sharing implementation for performing the corresponding processing. The embodiments described hereinafter embody various aspects and configurations, with the figures illustrating exemplary and non-limiting configurations. Computer-readable media and means for performing methods and processing block operations (e.g., a processor and memory or other apparatus configured to perform such operations) are disclosed and are in keeping with the extensible scope of the embodiments. The term "apparatus" is used consistently herein with its common definition of an appliance or device.

The steps, connections, and processing of signals and information illustrated in the figures, including, but not limited to, any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process read value—the value must be obtained prior to processing it, although some of the associated processing may be performed prior to, concurrently with, and/or after the read operation). Also, nothing described or referenced in this document is admitted as prior art to this application unless explicitly so stated.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc., as well as "particular," "specific," and "identifiable" are typically used herein to denote different units (e.g., a first widget or operation, a second widget or operation, a particular widget or operation, a specific widget or operation). The use of these terms herein does not necessarily connote an ordering such as one unit, operation or event occurring or coming before another or another characterization, but rather provides a mechanism to distinguish between elements units. Moreover, the phrases "based on x" and "in response to x" are used to indicate a minimum set of items "x" from which something is derived or caused, wherein "x" is extensible and does not necessarily describe a complete list of items on which the operation is performed, etc. The introduced element of "a plurality of widgets" may be subsequently referred to by "said widgets." Similarly, the introduced element of "one or more widgets" may be subsequently referred to by "said widgets" (referring to a single widget or multiple widgets). Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps. Finally, the term "particular machine," when recited in a method claim for performing steps, refers to a particular machine within the 35 USC § 101 machine statutory class.

FIG. 1A illustrates a packet switching device 100 according to one embodiment. As shown, packet switching device 100 includes multiple ingress interface groups 110-111 communicatively coupled via one or more communication mechanisms (e.g., switch matrix, fabric) 104 to egress interface group 120.

As used herein, an ingress interface group refers to a device (e.g., line card, board, switch stage) that includes at least one interface for receiving packets and at least one virtual output queue for storing packet entities corresponding to received packets; while an output interface group refers to a device (e.g., line card, board, switch stage) that includes at least one output queue for storing packet entities received from an ingress interface group and one or more interfaces for sending corresponding packets from the egress interface group.

As used herein, a "packet entity" refers to a discrete unit that includes data to identify a packet, such as, but not limited to the packet itself, a packet descriptor (e.g., comprising information for acquiring the packet from storage and typically some extracted data from a header of the packet for use in forwarding the packet entity through the packet switching device), and possibly other information/data (e.g., internal packet switch data including, but not limited to, time stamps, forwarding data, operations data, monitoring data, and/or other data or information).

In one embodiment, packet entities in the form of packets typically with some internal packet switch data (e.g., time stamps, forwarding information) are enqueued in virtual output queues then transferred over a packet switching mechanism (e.g., fabric, crossbar) to the appropriate output queue, wherein at least the packets are enqueued. In one embodiment, packet entities in the form of packet descriptors typically with some internal packet switch data (e.g., time stamps, forwarding information) are enqueued in virtual output queues then transferred over a packet switching mechanism (e.g., fabric, crossbar) to the appropriate output queue, wherein at least the packet descriptors are enqueued. In one embodiment, the packets are stored in shared memory and retrieved by an egress interface group based on the packet descriptor; thus, the resources of the communication mechanism(s) (e.g., not including the shared memory) are not consumed for transferring the entirety of the packets.

In one embodiment, an egress interface group includes an optimization of using virtual input queues (VIQs) for at least a portion of the VOQs (e.g., all VOQs, VOQs storing higher priority traffic), so that packet transmission cycles over a communications mechanism with switching contention that would otherwise not be used to transmit packets based on the order of requested VOQs, will be used to transmit a packet entity from a VOQ to its corresponding VIQ. In one embodiment, a VOQ request order scheduler does not make a distinction between packet entities in a VOQ vs. VIQ in determining the corresponding request order.

As shown in FIG. 1A, packet entities are enqueued in VOQs 118, 119 for packets (101) received by a corresponding ingress interface group 110, 111. In one embodiment, each of these packet entities include a time stamp (e.g., reflecting a system time of receipt or enqueuing of the packet) that is subsequently used by egress interface group 120 to maintain one or more latency characteristics of the corresponding VOQs 118 and 119 in one or more data structures. In one embodiment, maintaining these one or more latency characteristics includes subtracting a received time stamp from a current system time and updating one or more fields in latency data structures.

Based on the latency characteristics of VOQs 118 and 119 (e.g., without regards to length, latency or other characteristics of virtual output queues associated with other output queues), fully-local scheduler 125 on egress interface group 120 generates an ordered series of VOQ-identifying requests used by packet switching device 100 in a corresponding order, dequeuing packet entities from VOQs 118, 119 and transmitting these dequeued packet entities (105) over communication mechanism(s) 104 to egress interface group 120. In one embodiment, egress interface group 120 includes a virtual input queue (VIQ) 121 for each of VOQs 118, 119.

In one embodiment and responsive to a received requested packet entity (105), scheduler 125 maintains the latency data structure(s) ("D.S.") based on the time stamp of packet entity (105) (thus maintaining current latency information of VOQs 118, 119), with egress interface group 120 enqueuing the packet or packet descriptor of packet entity (105) in OQ 122, with corresponding packets (109) being sent from egress interface group 120 in response to the corresponding packet or packet descriptor being dequeued from OQ 122.

Figure 1B:
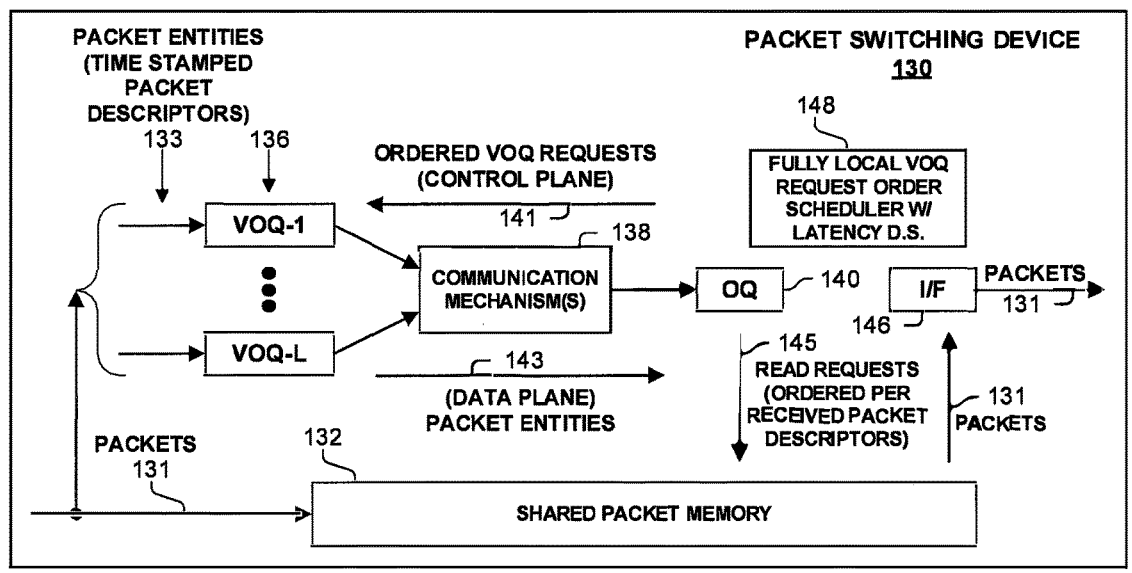
FIG. 1B illustrates a packet switching device according to one embodiment.

FIG. 1B illustrates a packet switching device 130 according to one embodiment that includes a single OQ 140 (e.g., on an egress interface group in one embodiment) that is associated with multiple VOQs 136 (e.g., one on each ingress interface group in one embodiment). Packets 131 are received and stored in shared packet memory 132. Based on a forwarding decision for each of these packets identifying to effectively be forwarded through OQ 140, a corresponding packet entity 133 (e.g., with a packet descriptor and a time stamp) is enqueued in a corresponding first-in-first-out (FIFO) VOQ 136. In one embodiment, VOQ 136 is on the ingress interface group on which the corresponding packet 131 was received.

VOQ request order scheduler 148, based on its maintained latency data structure for each of VOQs 136, identifies an ordered sequence of VOQ requests that are communicated (141) via communication mechanism(s) 138 (e.g., control plane communication or piggybacking data plane communication). In response, time stamped packet descriptors (133) are dequeued in a corresponding order from VOQs 136, and communicated as packet entities (143) communicated over communication mechanism(s) 138 (e.g., data plane communication). In one embodiment, the packet descriptor in the received packet entity (143) is enqueued in FIFO OQ 140, with scheduler 148 maintaining a VOQ latency data structure based on the time stamp in the received packet entity (143) (e.g., identifying latency characteristic(s) directly or used to determine latency characteristic(s) of the corresponding VOQ (136)).

In one embodiment, in response to a packet descriptor being dequeued from OQ 140, the corresponding packet (131) is retrieved (145) from shared packet memory 132 and sent from egress interface 146.

One embodiment retrieves (145) the corresponding packet (131) from shared packet memory 132 in response to receiving its packet entity (143) or enqueuing of its packet descriptor, with the retrieved packet 131 being stored in a buffer associated with egress interface 146. This packet 131 is then read from this buffer memory and sent from egress interface 146 in response to its packet descriptor being dequeued from OQ 140. In one embodiment, buffer memory is faster than shared memory 132. In one embodiment, there is contention among multiple egress interfaces for reading packets from packet memory 132, so reading and buffering of packets a priori provides efficiencies over delaying the read operation until dequeuing of its packet descriptor.

In one embodiment, the corresponding packet (131) is retrieved (145) from shared packet memory 132 in response to its packet descriptor being received in packet entity (143), with the retrieved packet 131 being enqueue in FIFO OQ 140 (e.g., in order of read requests for packets associated with OQ 140). Packets 131 are subsequently sent from egress interface 146 in response to being dequeued from OQ 140.

Figure 1C:
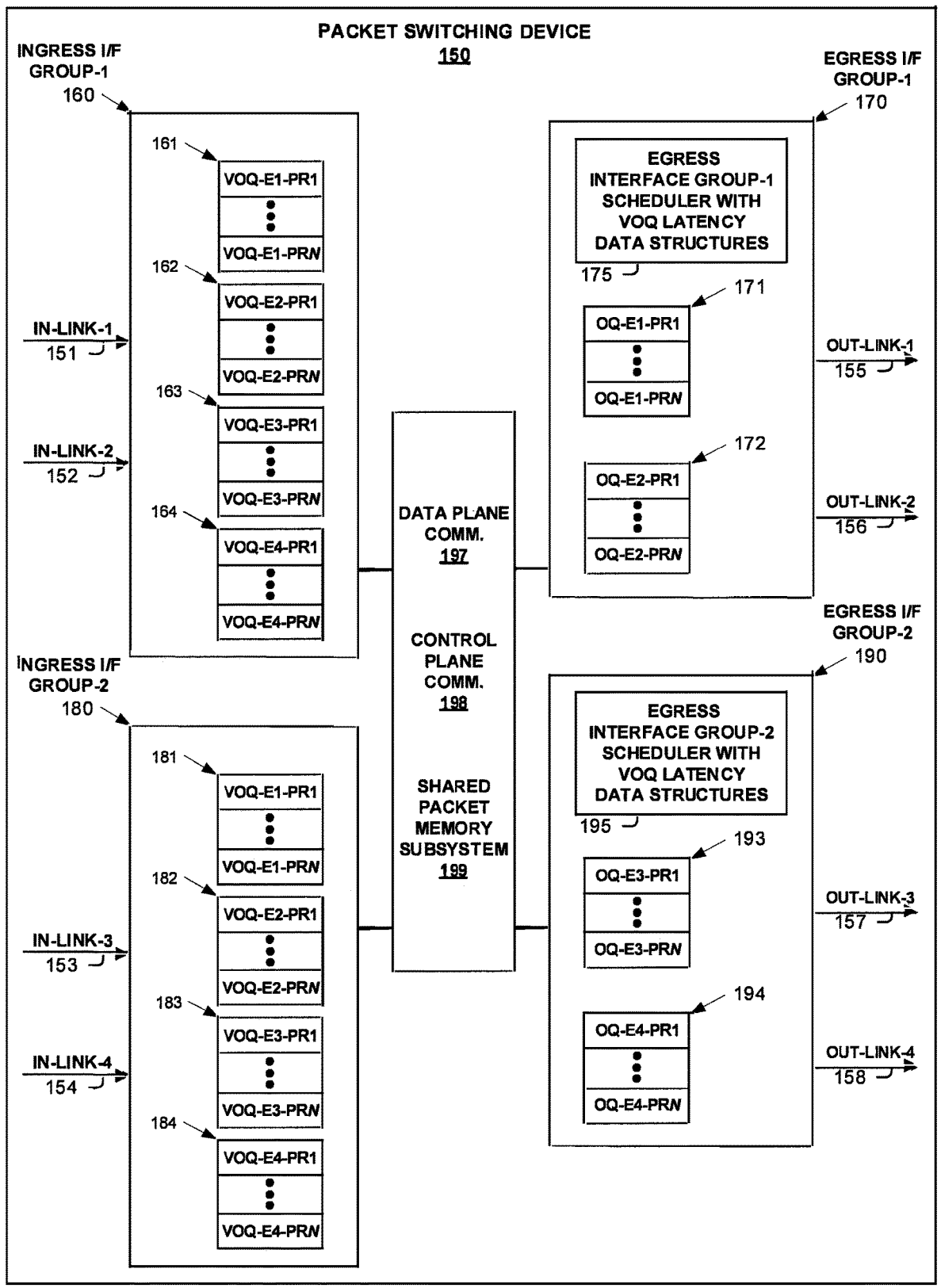
FIG. 1C illustrates a packet switching device according to one embodiment.

FIG. 1C illustrates a packet switching device 150 according to one embodiment. As shown, packet switching device 150 includes two ingress interface groups 160 and 180 and two egress interface groups 170 and 190. One embodiment includes more input links, output links, ingress interface groups, and/or egress interface groups than shown in FIG. 1C. In one embodiment, ingress interface group-1 (160) and egress interface group-1 (170) are located on a same line card or other board. In one embodiment, ingress interface group-2 (180) and egress interface group-2 (190) are located on a same line card or other board.

Each of ingress interface groups 160 and 180 is communicatively coupled via data plane communication (197) to each of egress interface groups 170 and 190. In one embodiment, data plane communication (197) includes a switch matrix with connections enabling for each packet communication cycle M packet entities to be sent from each of ingress interface groups 160 and 180 and two packet entities to be received by each of egress interface groups 170 and 190, with M being at least one. In one embodiment, M is two. In one embodiment, M is an integer more than two.

Each of ingress interface groups 160 and 180 and egress interface groups 170 and 190 is communicatively coupled to shared packet memory subsystem (199). In one embodiment for each memory cycle using shared packet memory subsystem (199), each of ingress interface groups 160 and 180 can store K packets and each of egress interface groups 170 and 190 can retrieve K packets, with K being at least one. In one embodiment, K is two. In one embodiment, K is more than two.

Each of ingress interface groups 160 and 180 is communicatively coupled via control plane communication (198) to each of egress interface groups 170 and 190. In one embodiment, control plane communication (198) provides for communication of VOQ requests between each of egress interface groups 170 and 190 with each of ingress interface groups 160 and 180 during each packet communication cycle.

In one embodiment, packet switching device switches packets according to N different priority levels, with N being an integer of at least one. In one embodiment, N is two. In one embodiment, N is more than two.

As shown in FIG. 1C, egress interface group-1 (170) includes a set of N output queues (171) associated with sending packet out egress link-1 (155) and N output queues (172) associated with sending packet out egress link-2 (156). Additionally, egress interface group-2 (190) includes a set of N output queues (193) associated with sending packets out egress link-3 (157) and N output queues (194) associated with sending packets out egress link-4 (158).

Also shown in FIG. 1C, ingress interface group-1 (160) includes four sets of N-VOQs (161-164), with VOQs 161 associated with OQs 171 of egress interface group-1 (170), VOQs 162 associated with OQs 172 of egress interface group-1 (170), VOQs 163 associated with OQs 193 of egress interface group-2 (190), and VOQs 164 associated with OQs 194 of egress interface group-2 (190). Similarly, ingress interface group-2 (180) includes four sets of N-VOQs (181-184), with VOQs 181 associated with OQs 171 of egress interface group-1 (170), VOQs 182 associated with OQs 172 of egress interface group-1 (170), VOQs 183 associated with OQs 193 of egress interface group-2 (190), and VOQs 184 associated with OQs 194 of egress interface group-2 (190).

In one embodiment, each particular packet received on ingress link 151-154 is classified to determine from which output link 155-158 the particular packet is to be sent and a corresponding priority (e.g., ranging from one to N). The particular packet is stored in shared packet memory subsystem (199), with a corresponding packet entity enqueued in corresponding particular VOQ (161-164, 181-184) at a particular time. In one embodiment, each packet entity includes a packet descriptor of the particular packet and a timestamp (e.g., the particular time) to be used by the corresponding egress interface group scheduler (175, 195) in maintaining one or more current latency characteristics for the particular VOQ (161-164, 181-184).

Based on the VOQ latency information stored in its VOQ latency data structure(s), egress interface group-1 scheduler 175 individually and independently determines a next VOQ (161, 162, 181, 182) from which to dequeue a packet entity for each of the N OQs 171 and N OQs 172. Similarly, based on the VOQ latency information stored in its VOQ latency data structure(s), egress interface group-2 scheduler 195 individually and independently determines a next VOQ (163, 164, 183, 184) from which to dequeue a packet entity for each of the N OQs 193 and N OQs 194.

Figure 2A:
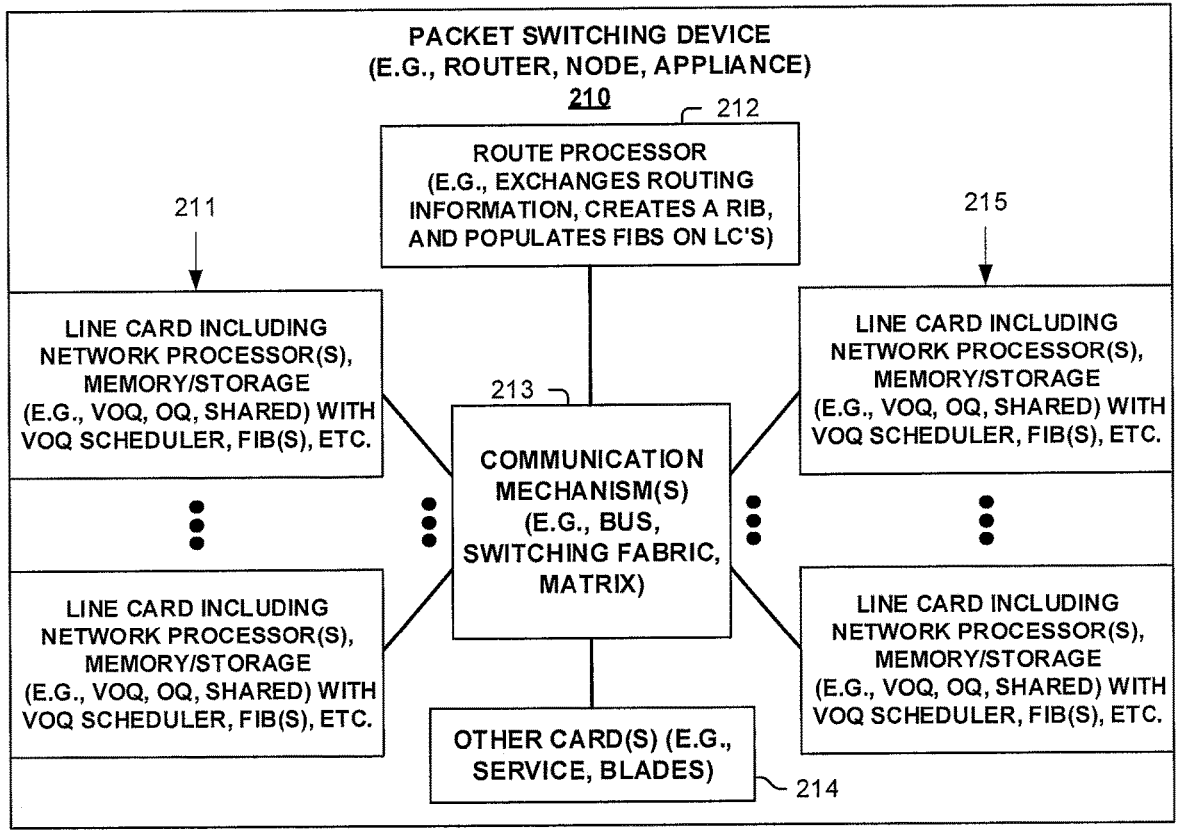
FIG. 2A illustrates a packet switching device according to one embodiment.
Figure 2B:
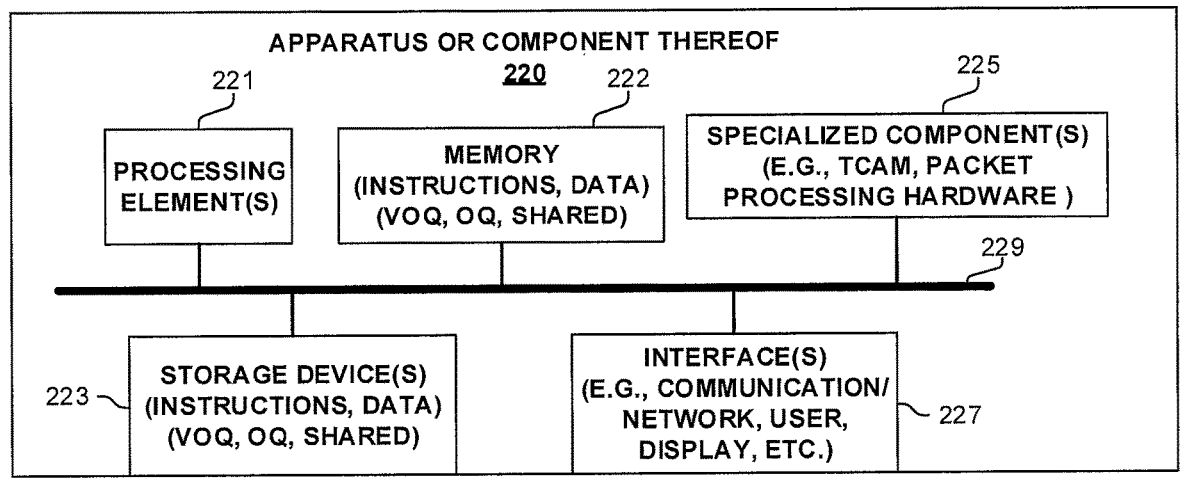
FIG. 2B illustrates an apparatus according to one embodiment.

FIGS. 2A-B and their discussion herein provide a description of various network nodes according to one embodiment.

FIG. 2A illustrates one embodiment of a packet switching device 210 (e.g., router, node, appliance, gateway) according to one embodiment. As shown, packet switching device 210 includes multiple line cards 211 and 215, each with one or more network interfaces for sending and receiving packets over communications links (e.g., possibly part of a link aggregation group), and with one or more processing elements that are used in one embodiment associated with achieving quasi-Output Queue behavior of a packet switching device using virtual output queue ordering independently determined for each output queue. Packet switching device 210 also has a control plane with one or more processing elements (e.g., Route Processor(s)) 212 for managing the control plane and/or control plane processing of packets associated with achieving quasi-Output Queue behavior of a packet switching device using virtual output queue ordering independently determined for each output queue. Packet switching device 210 also includes other cards 214 (e.g., service cards, blades) which include processing elements that are used in one embodiment to process (e.g., forward/send, drop, manipulate, change, modify, receive, create, duplicate, possibly operating in conjunction with shared memory and/or with one or more service functions, apply a service according to one or more service functions) associated with achieving quasi-Output Queue behavior of a packet switching device using virtual output queue ordering independently determined for each output queue, and some hardware-based communication mechanism(s) 213 (e.g., bus, switching fabric, and/or matrix, etc.)

for allowing its different entities 211, 212, 214 and 215 to communicate. Line cards 211 and 215 typically perform the actions of being both an ingress and egress line card (e.g., including VOQs, OQs and VOQ schedulers), in regards to multiple other particular packets and/or packet streams being received by, or sent from, packet switching device 210.

FIG. 2B is a block diagram of an apparatus 220 (e.g., host, router, node, destination, or portion thereof) used in one embodiment associated with achieving quasi-Output Queue behavior of a packet switching device using virtual output queue ordering independently determined for each output queue.

In one embodiment, apparatus 220 performs one or more processes, or portions thereof, corresponding to one of the flow diagrams illustrated or otherwise described herein, and/or illustrated in another diagram or otherwise described herein.

In one embodiment, apparatus 220 includes one or more processor(s) 221 (typically with on-chip memory), memory 222 (possibly shared memory, VOQs, OQs), storage device(s) 223 ((possibly shared memory, VOQs, OQs), specialized component(s) 225 (e.g. optimized hardware such as for performing lookup, packet processing; associative memory; binary and/or ternary content-addressable memory; Application Specific Integrated Circuit(s), cryptographic hash hardware, etc.), and interface(s) 227 for communicating information (e.g., sending and receiving packets, user-interfaces, displaying information, etc.), which are typically communicatively coupled via one or more communications mechanisms 229 (e.g., bus, links, switching fabric, matrix), with the communications paths typically tailored to meet the needs of a particular application.

Various embodiments of apparatus 220 may include more or fewer elements. The operation of apparatus 220 is typically controlled by processor(s) 221 using memory 222 and storage device(s) 223 (e.g., including VOQs, OQs) to perform one or more tasks or processes. Memory 222 is one type of computer-readable/computer-storage medium, and typically comprises random access memory (RAM), read only memory (ROM), flash memory, integrated circuits, and/or other memory components. Memory 222 typically stores computer-executable instructions to be executed by processor(s) 221 and/or data which is manipulated by processor(s) 221 for implementing functionality in accordance with an embodiment. Storage device(s) 223 are another type of computer-readable medium, and typically comprise solid state storage media, disk drives, diskettes, networked services, tape drives, and other storage devices. Storage device(s) 223 typically store computer-executable instructions to be executed by processor(s) 221 and/or data which is manipulated by processor(s) 221 for implementing functionality in accordance with an embodiment.

Figure 3A:
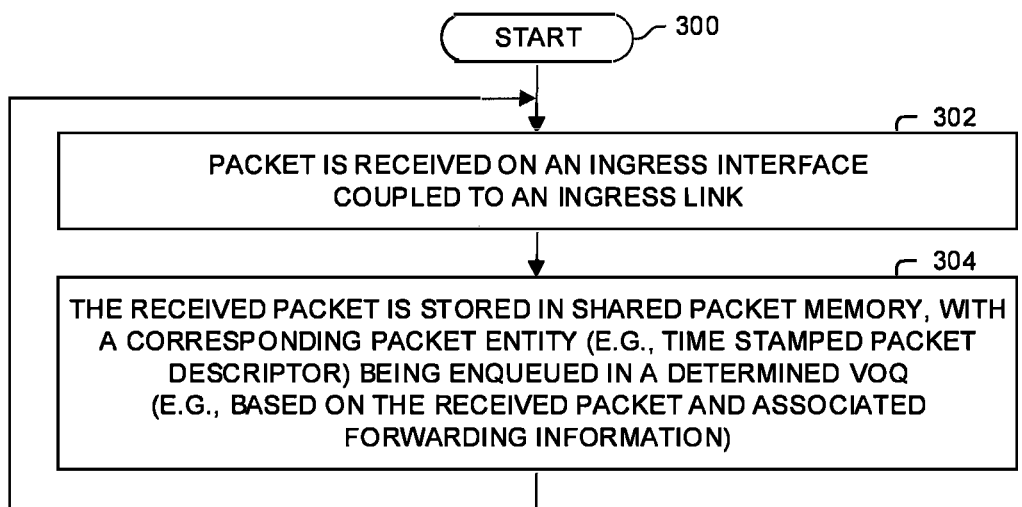
FIG. 3A illustrates a process according to one embodiment.

FIG. 3A illustrates a process according to one embodiment. Processing of this data plane process begins with processing block 300. In processing block 302, a packet is received on an ingress interface communicatively coupled to an ingress link. In processing block 304, the received packet is stored in shared packet memory, with a corresponding packet entity (e.g., time stamped packet descriptor) being enqueued in a VOQ determined based on the packet and associated forwarding information (e.g., the VOQ associated with a corresponding OQ and priority level). Processing returns to processing block 302 to receive and process more packets.

Figure 3B:
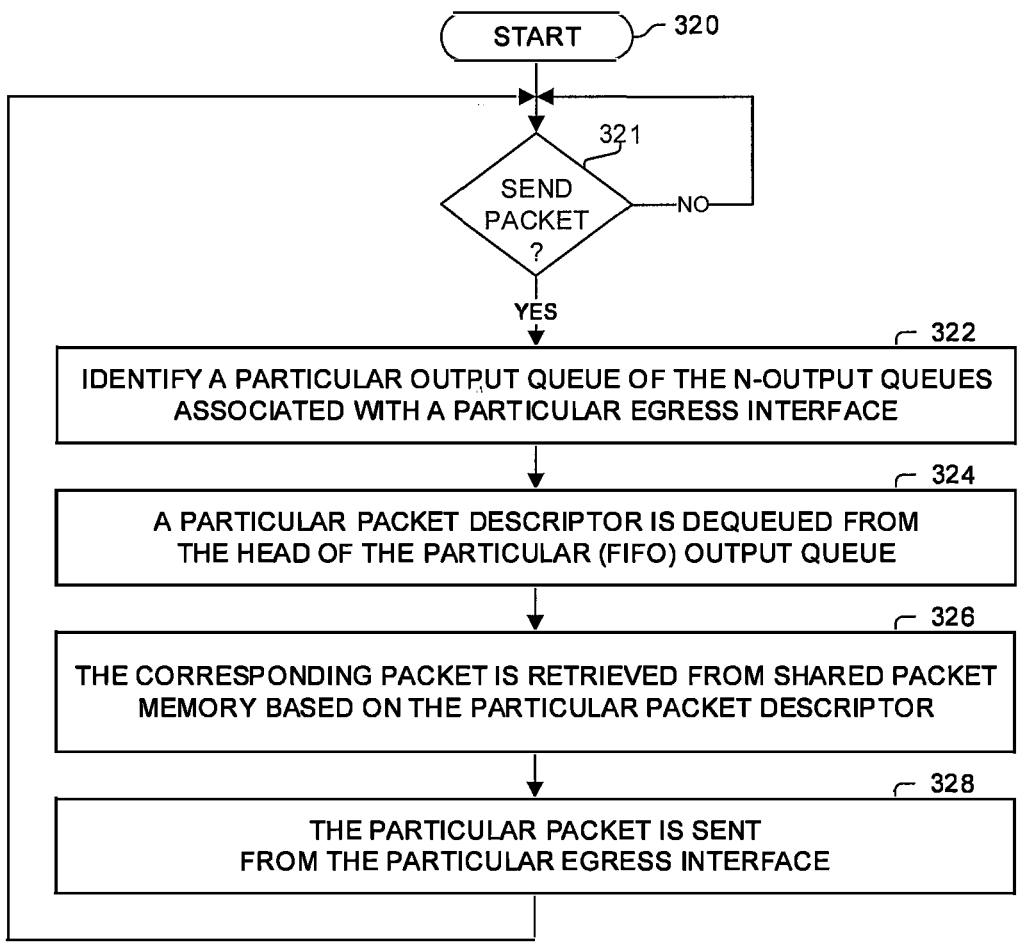
FIG. 3B illustrates a process according to one embodiment.

FIG. 3B illustrates a process according to one embodiment. Processing of this data plane process begins with processing block 320. As determined in processing block 321, if it is time to send a packet from the packet switching device for a particular egress interface, processing proceeds to processing block 322; otherwise, processing remains at processing block 321. Continuing processing in processing block 322, a non-empty particular output queue of the N-output queues (one for each of the N priority levels) associated with the particular egress interface is identified (e.g., based on an allocation of bandwidth among priority levels or other scheduling algorithm). In processing block 324, a particular packet descriptor is dequeued from the head of the identified particular FIFO output queue. In processing block 326, the corresponding packet is retrieved from the shared packet memory subsystem based on the particular packet descriptor. In processing block 328, the particular packet is sent from the particular egress interface. Processing returns to processing block 321.

Figure 3C:
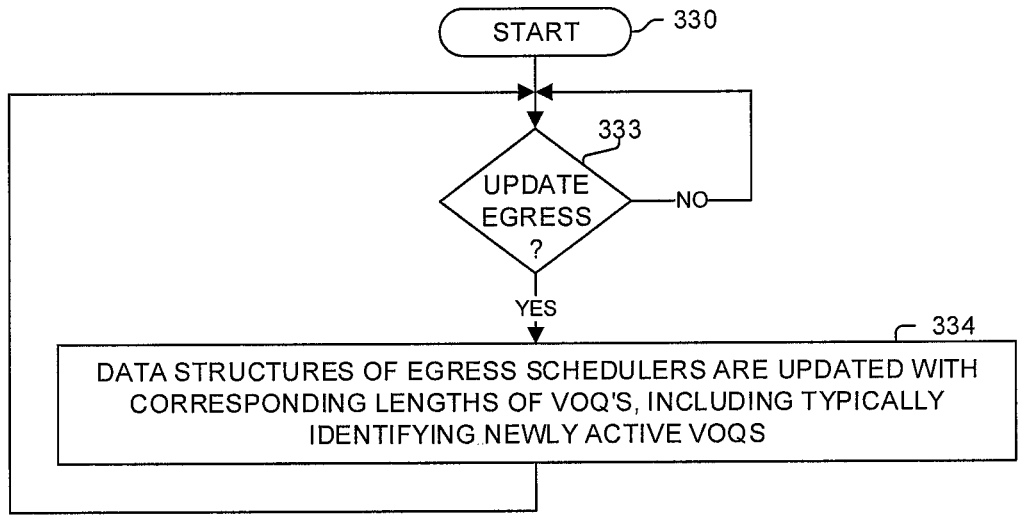
FIG. 3C illustrates a process according to one embodiment.

FIG. 3C illustrates a process according to one embodiment. Processing of this control plane process begins with processing block 330. As determined in processing block 333, if it is time to update a VOQ scheduler on one or more egress interface groups, then processing proceeds to processing block 334; otherwise, processing remains at processing block 333. Continuing processing in processing block 334, data structure(s) in VOQ schedulers in the egress interface groups are updated with corresponding current VOQ lengths, including identifying newly active VOQs (e.g., transitioned from being empty to being non-empty). In one embodiment, this information is communicated over control plane communications between ingress interface groups and egress interface groups. Processing returns to processing block 333.

Figure 3D:
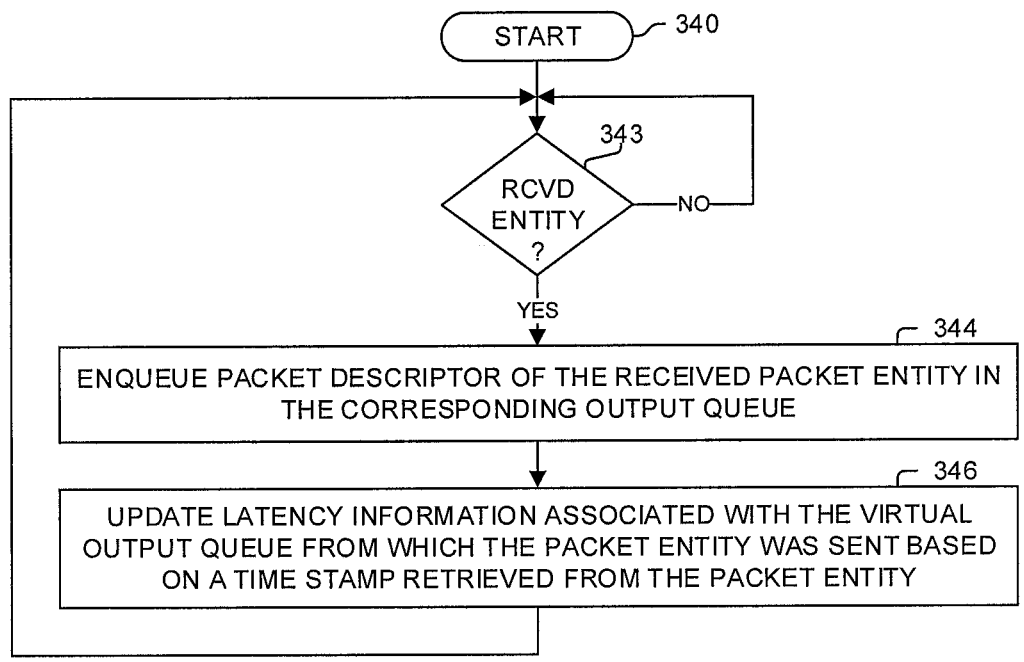
FIG. 3D illustrates a process according to one embodiment.

FIG. 3D illustrates a process according to one embodiment. Processing begins with processing block 340. As determined in processing block 343, if a packet entity has been received by this egress interface group, then processing proceeds to processing block 344; otherwise, processing remains at processing block 343. Continuing processing in processing block 344, the packet descriptor in the received packet entity is enqueued in the corresponding output queue. In processing block 346 of one embodiment, latency information associated with the VOQ from which the packet entity was sent is updated based on a time stamp extracted from the received packet entity. In one embodiment, one or more characteristic(s) (e.g., longest, shortest, average latencies of the VOQs or the non-empty VOQs associated with the corresponding output queue) are updated based on a time stamp retrieved from the packet entity. Processing returns to processing block 343.

Figure 3E:
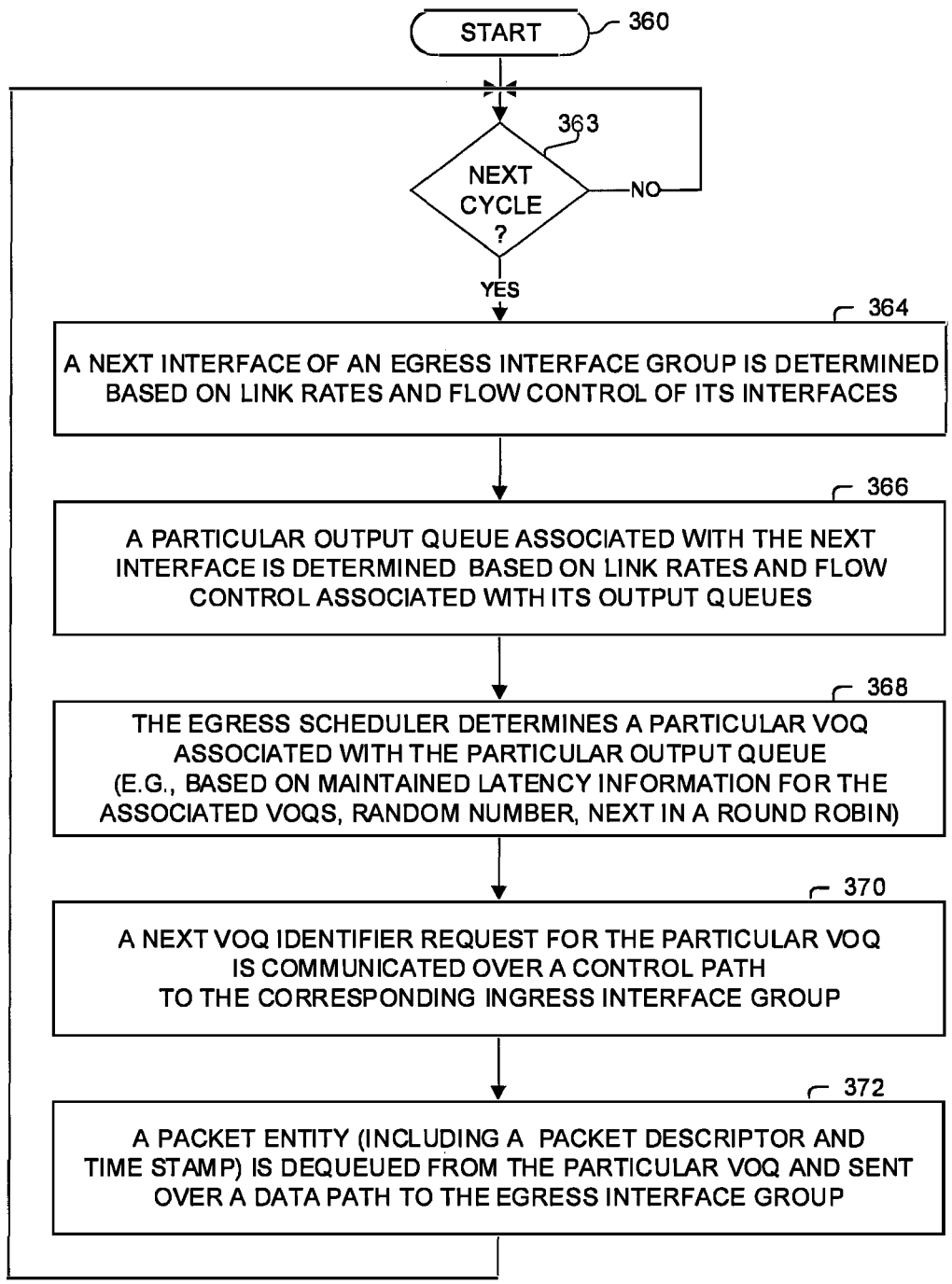
FIG. 3E illustrates a process according to one embodiment.

FIG. 3E illustrates a process according to one embodiment performed for each particular egress interface group. Processing begins with processing block 360. As determined in processing block 363, upon beginning of a next packet cycle for communicating a packet over a constrained data path (e.g., matrix) between ingress and egress interface groups, processing proceeds to processing block 364; otherwise, processing remains at processing block 363.

Continuing processing in processing block 364, a next interface of the particular egress interface group is determined based on link rates and flow control of egress interfaces (e.g., egress interface bandwidth is proportionally allocated in one embodiment). In processing block 366, a particular OQ associated with the determined next interface is identified based on link rates and flow control associated with the OQs of the particular egress interface group (e.g., bandwidth is proportionally allocated in one embodiment).

In processing block 368, the egress VOQ scheduler determines a particular VOQ associated with the particular OQ, with this determination being made in a manner independent (e.g., without consideration) of VOQs of other OQs. In one embodiment, this determination is made based on maintained latency information (e.g., longest, shortest, average latencies) associated with the VOQs of the particular output queue, random number(s), weighting of one or more VOQs having a particular latency characteristic, selecting a next in a round robin). In processing block 370, a next VOQ identifier corresponding to the determined particular VOQ is communicated (e.g., over a control path) to the corresponding ingress interface group. In processing block 372, a packet entity (including a packet descriptor and latency-associated time stamp) is dequeued from the particular VOQ and sent over the constrained data path to the egress interface group. Processing returns to processing block 363.

Thus, in one embodiment, all packets from all VOQs with same port-priority destination experience similar latency within a specific time-window, which is similar to the packet service provided by an OQ switch architecture as all packets with same port-priority destination will be submitted into same OQ; and hence, will experience similar latency within the specific time-window. Additionally, in one embodiment, all input ports that send traffic to same output port-priority receive bandwidth which is proportional to their bandwidth demand divided by total bandwidth.

Independently determining a next VOQ for each of the output queues provides a practical, faster and more efficient scheduling determinations (e.g., no sorting and/or no consideration of VOQs of other OQs in one embodiment) for a packet switching device, and basing these determinations on current VOQ latencies provides desired behavior that approximates Output Queue behavior of a packet switching device.

In this manner, the behavior of one embodiment provides latency fairness among virtual output queues of each output queue in scalable implementations using bounded different VOQ orderings when compared to the corresponding ordering of an ideal Output Queue.

Prior packet switching systems attempting to emulate Output Queue behavior typically required complex and time-consuming calculations (e.g., sorting of time values of all VOQs of all OQs) and specialized hardware (e.g., non-FIFO queues), such that they are impractical for use in the highest performance switches and routers. While the VOQ architecture is highly scalable, each VOQ to OQ scheduler provides provide different scheduling results based on its algorithm. For example, packet-level VOQs round-robin scheduling may cause an input port that transmits large packets to consume more bandwidth than an input port that transmits small packets towards same output port even though both input ports are transmitting the same bandwidth of packets towards the output port. In a second example, VOQ round-robin scheduling may result in an input-port with low packet bandwidth demands towards an output port and input-port with high packet bandwidth demands towards the same output-port, to receive same bandwidth.

Figure 4A:
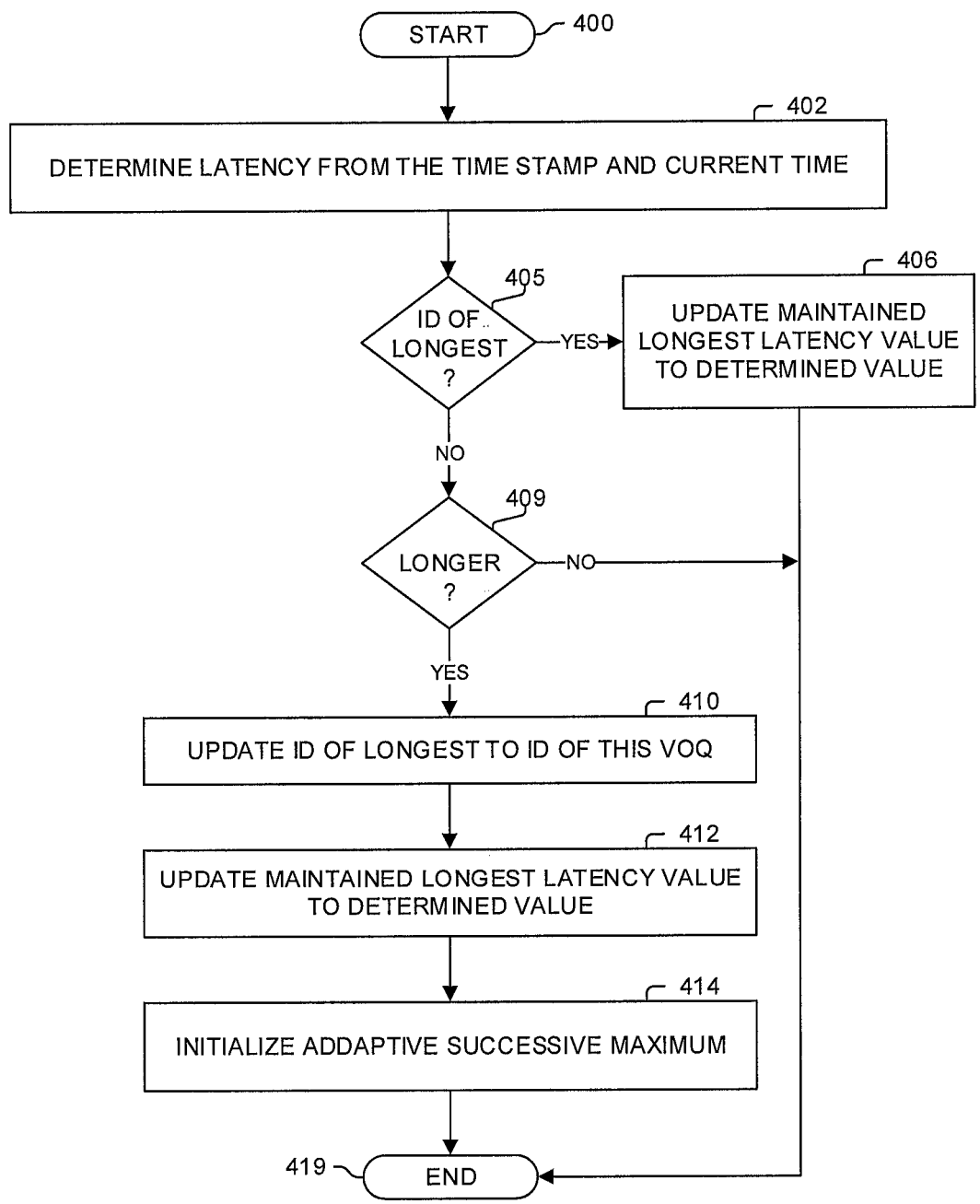
FIG. 4A illustrates a process according to one embodiment.
Figure 4B:
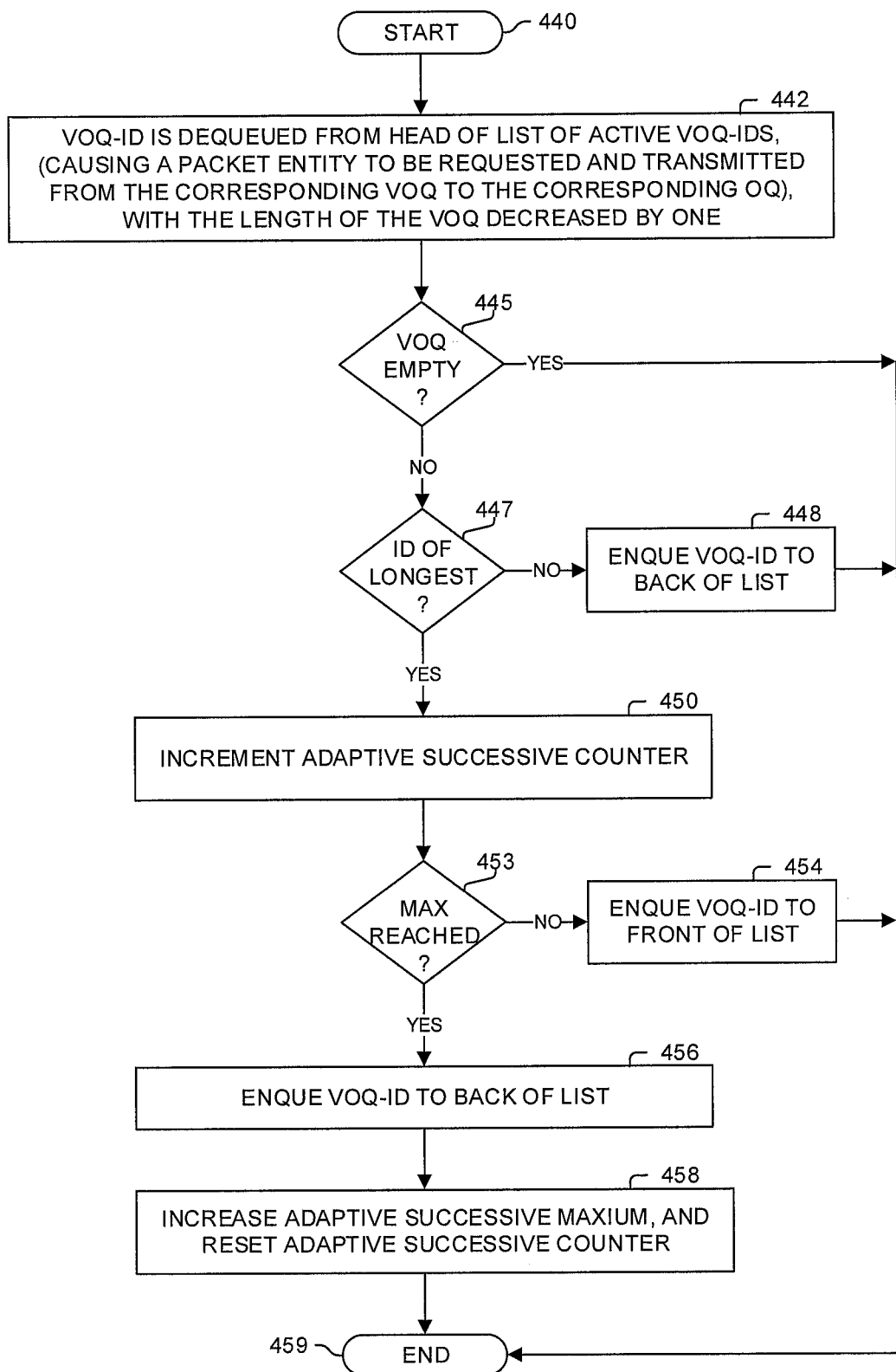
FIG. 4B illustrates a process according to one embodiment.

FIGS. 4A-B illustrate processes for identifying a next VOQ performed in one embodiment. In one embodiment, the processes of FIGS. 4A-B are performed in parallel, with the maintained latency information being updated (e.g., in FIG. 4A) based on a time value in packet entity received based on a VOQ-ID request identifying a particular VOQ (e.g., as determined in processing block 442 of FIG. 4B).

In one embodiment, the time value directly identifies a latency for the corresponding VOQ. In one embodiment, the time value indirectly identifies a latency for the corresponding VOQ, such as by, but not limited to, subtracting it from a current system time.

Although one embodiment described in relation to FIGS. 4A-B uses longest latency information, one embodiment maintains one or more latency characters (e.g., longest, shortest, average and/or other values) and uses one or more of these latency characteristics in determining a next VOQ-ID (e.g., whether a selected VOQ-ID is to remain at the head/first position of the queue/list or to be placed at the tail/last position of the queue/list.

FIG. 4A illustrates maintenance of latency information (e.g., in processing block 346 of FIG. 3D) for each VOQ, including longest latency information, performed in one embodiment.

Processing begins with processing block 400. In processing block 402, a VOQ latency is determined by subtracting the received time stamp from a current system time. As determined in processing block 405, if the VOQ from which the packet entity (including the time stamp) identifies the VOQ having the longest latency, then the maintained longest latency value is updated to the determined latency value in processing block 406, and processing proceeds directly to processing block 419.

Otherwise continuing with processing block 409, as determined therein, if the determined latency is greater than the previous longest latency, then processing proceeds to processing block 410; otherwise, processing proceeds directly to processing block 419.

Continuing with processing block 410, the maintained identifier of the VOQ with the longest latency is updated. In processing block 412, the maintained longest latency of a VOQ associated with the OQ is updated. In processing block 414, an adaptive successive maximum value is initialized to limit the number of times a same VOQ can be sent repetitively for an OQ (e.g., used when at least two VOQs are active). Continuing with processing block 419, processing of the flow diagram of FIG. 4A is complete.

FIG. 4B illustrates a process performed in one embodiment for independently determining a next VOQ of an identified OQ from which to request a packet entity (e.g., performed in processing block 368 of FIG. 3E in one embodiment). One embodiment maintains an ordered list (aka a FIFO queue) of active VOQs for each OQ. This list is sequenced through in identifying the next VOQ, while possibly remaining at a same position in the list based on a longest latency determination while not exceeding the adaptive successive maximum value.

Thus, one embodiment allocates more bandwidth (e.g., based on current adaptive successive maximum value) to the particular VOQ when the maintained latency information identifies it as having the longest latency of the VOQs associated with the corresponding OQ (e.g., as determined in processing block 447), while preventing pathological behavior by limiting the number of consecutive times a VOQ-ID request is sent for the same particular VOQ (e.g., as determined in the adaptive decision made processing block 453). In this manner, one embodiment compensates for VOQs receiving smaller packets than other VOQs associated with the same OQ. Also, by increasing the adaptive successive maximum value (e.g., in processing block 458) in response to having invoked this limitation, more bandwidth is adaptively made available (e.g., more consecutive iterations) for a next VOQ identified has having the longest latency (e.g., as determined in processing block 447).

Processing begins with processing block 440. In processing block 442, a particular VOQ-ID is dequeued from head of list of active VOQ-IDS, (causing a packet descriptor request to be requested and transmitted from the corresponding VOQ such as per processing blocks 370-372 of FIG. 3E), with the number of packets (e.g., per a variable maintained in the egress interface group) in corresponding VOQ reduced by one. As determined in processing block 445, if the corresponding VOQ is now identified as being empty, then processing proceeds directly to processing block 459; otherwise, processing proceeds to processing block 447.

Continuing with processing block 447, as determined therein, if the particular VOQ-ID is that of the VOQ identified in the maintained latency information as having the longest latency for the OQ (e.g., maintained in a variable by the VOQ scheduler), then processing proceeds to processing block 450; otherwise, processing proceeds to processing block 448.

Continuing with processing block 448, the particular VOQ-ID is placed at the end/tail of the list/queue of active VOQs for the OQ. Processing proceeds directly to processing block 459.

Continuing with processing block 450, the adaptive successive counter is incremented by one (having been initially set to zero in a prior iteration in processing block 458). As determined in processing block 453, if the adaptive successive counter is equal to the adaptive successive maximum value, then processing proceeds to processing block 456; otherwise, processing proceeds to processing block 454.

Continuing with processing block 454, the particular VOQ-ID is placed at the front of the list of active VOQs for the OQ (so the same VOQ-ID will be used in processing block 442 in the next iteration of the loop illustrated in FIG. 4B). Processing proceeds directly to processing block 459.

Continuing with processing block 456, the particular VOQ-ID is placed at the end of the list of active VOQs for the OQ. In processing block 458, the adaptive successive maximum value is increased to provide for future increased iterations for the particular VOQ (e.g., to compensate for smaller packets being sent via the particular VOQ, and its adaptive successive counter is reset to zero). Processing proceeds directly to processing block 459.

Continuing with processing block 459, processing of the flow diagram of FIG. 4B is complete.

Figure 5A:
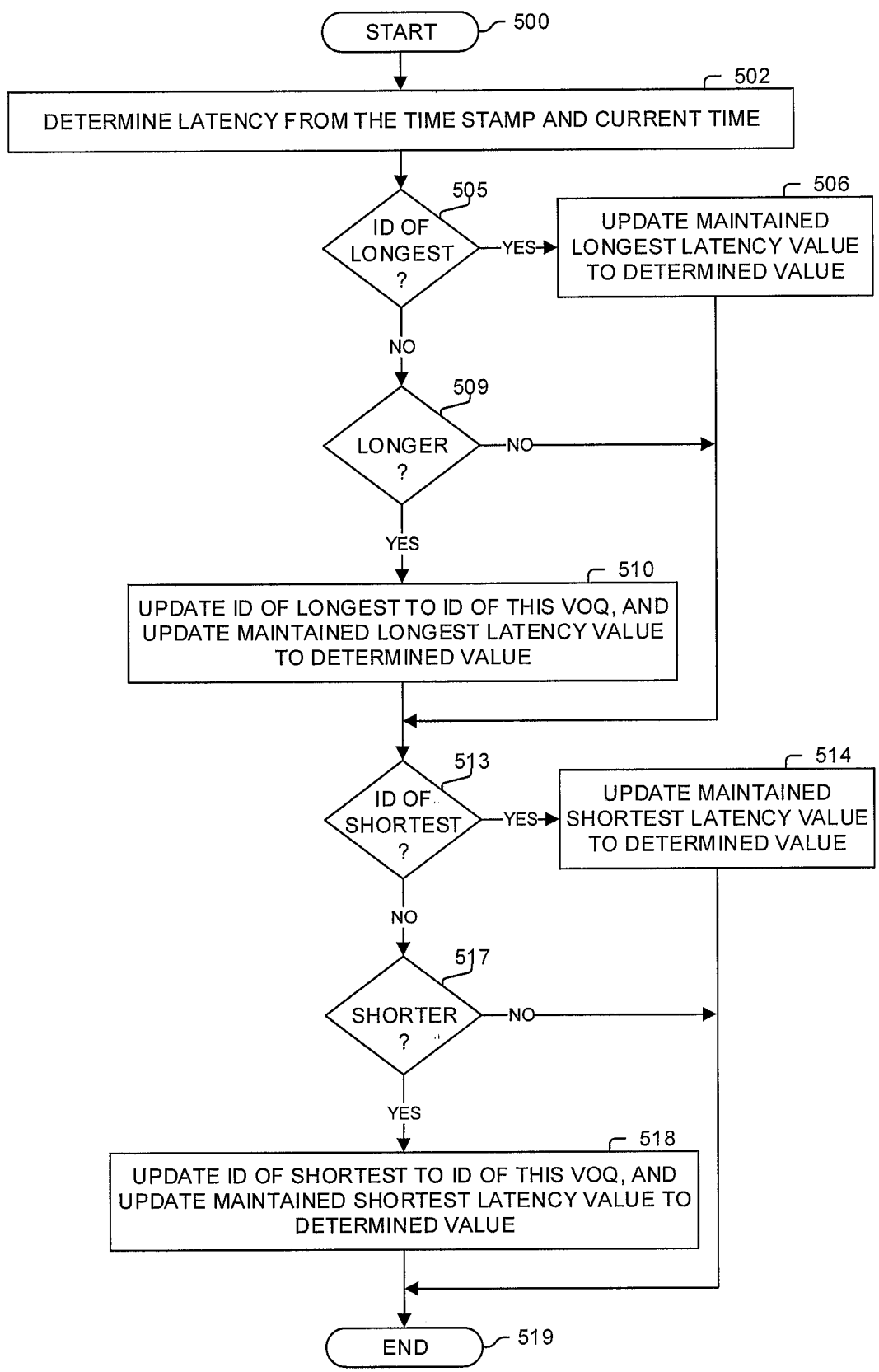
FIG. 5A illustrates a process according to one embodiment.
Figure 5B:
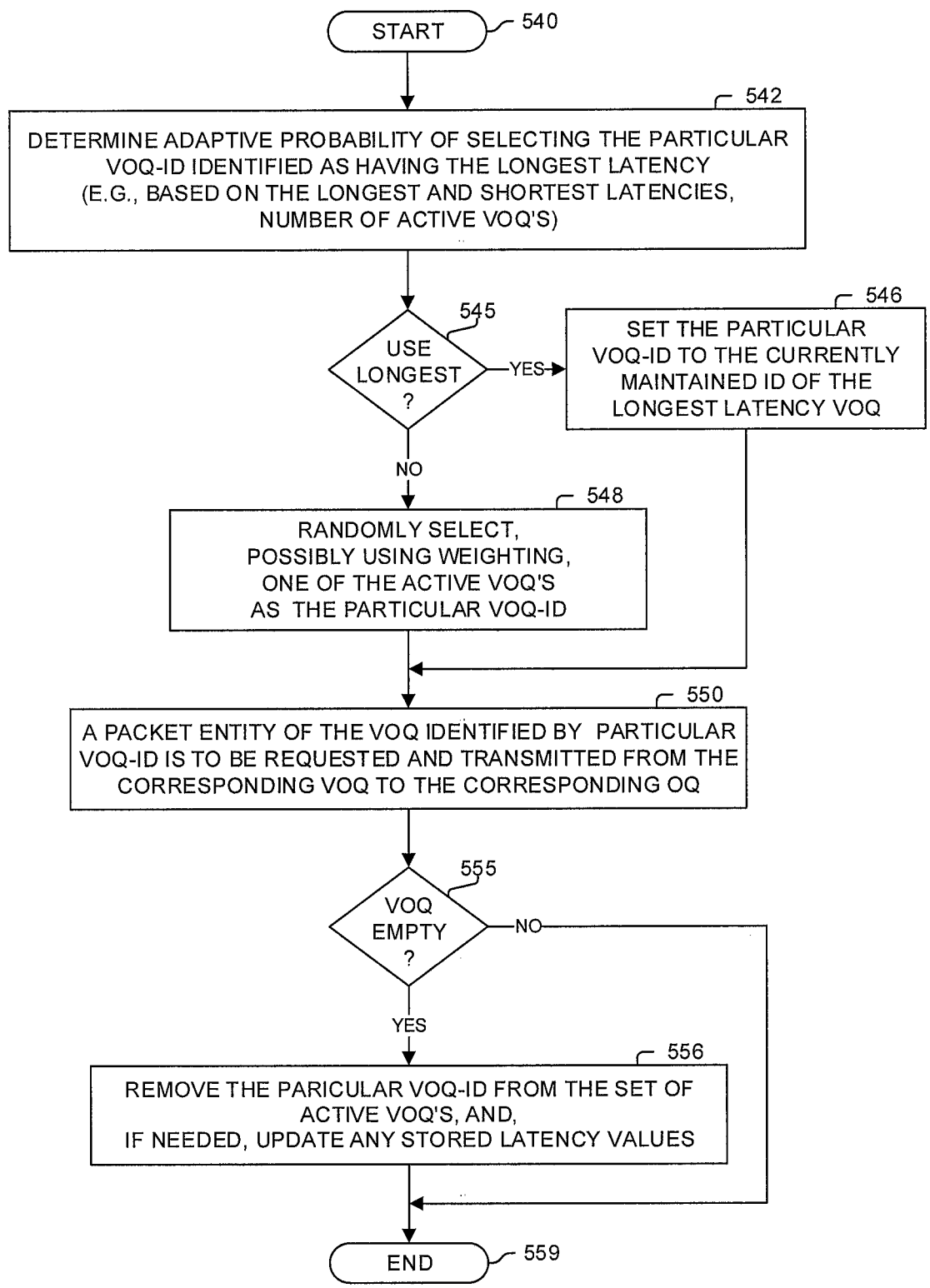
FIG. 5B illustrates a process according to one embodiment.

FIGS. 5A-B illustrate processes for identifying a next VOQ performed in one embodiment. In one embodiment, the processes of FIGS. 5A-B are performed in parallel, with the maintained latency information being updated (e.g., in FIG. 5A) based on a time value in packet entity received based on a VOQ-ID request identifying a particular VOQ (e.g., as determined in processing block 548 of FIG. 5B).

In one embodiment, the time value directly identifies a latency for the corresponding VOQ. In one embodiment, the time value indirectly identifies a latency for the corresponding VOQ, such as by, but not limited to, subtracting it from a current system time.

Although one embodiment described in relation to FIGS. 5A-B uses longest and shortest latency information, one embodiment maintains one or more latency characters (e.g., longest, shortest, average and/or other values) and uses one or more latency of these characteristics in determining a next VOQ-ID (e.g., weighting one or more of these characteristic and comparing this value with a generated random number in selecting a next VOQ-ID.

FIG. 5A illustrates maintenance of latency information (e.g., in processing block 346 of FIG. 3D) for each VOQ, including longest and shortest latency information, performed in one embodiment.

Processing begins with processing block 500. In processing block 502, a VOQ latency is determined by subtracting the received time stamp from a current system time. As determined in processing block 505, if the VOQ from which the packet entity (including the time stamp) identifies the VOQ having the longest latency, then the maintained longest latency value is updated to the determined latency value in processing block 506, and processing proceeds directly to processing block 513.

Otherwise, continuing with processing block 509, as determined therein, if the determined latency is greater than the previous longest latency, then processing proceeds to processing block 510; otherwise, processing proceeds directly to processing block 513.

Continuing with processing block 510, the maintained identifier of the VOQ with the longest latency is updated, and the maintained longest latency of a VOQ associated with the OQ is updated. Processing continues in processing block 513.

Continuing with processing block 513, as determined therein, if the VOQ from which the packet entity (including the time stamp) identifies the VOQ having the shortest latency, then the maintained shortest latency value is updated to the determined latency value in processing block 514, and processing proceeds directly to processing block 519.

Otherwise, continuing with processing block 517, as determined therein, if the determined latency is less than the previous shortest latency, then processing proceeds to processing block 518; otherwise, processing proceeds directly to processing block 519.

Continuing with processing block 518, the maintained identifier of the VOQ with the shortest latency is updated, and the maintained shortest latency of a VOQ associated with the OQ is updated. Processing continues to processing block 519.

Continuing with processing block 519, processing of the flow diagram of FIG. 5A is complete.

FIG. 5B illustrates a process performed in one embodiment for independently determining a next VOQ (e.g., VOQ-ID) of an identified OQ from which to request a packet entity (e.g., performed in processing block 368 of FIG. 3E in one embodiment). One embodiment maintains a set of VOQ-IDs corresponding to active VOQs for each OQ. A next VOQ-ID is selected from the set of VOQ-IDs for an OQ using weighted value(s) based on maintained longest and shortest latency information for VOQs of each OQ (e.g., per FIG. 5A). In one embodiment, the weighting is also a function of the number of active VOQ-IDs in the set of VOQ-IDs.

Processing begins with processing block 540. In processing block 542, a determination is made of an adaptive probability of selecting the particular VOQ-ID identified in the maintained latency information as having the longest latency. As the maintained latency is updated based on the time stamp in the packet entity received based on its corresponding VOQ-ID request, one embodiment limits this adaptive probability to be less than one to allow any of the active VOQ-IDs for the OQ to be selected. Thus, pathological behavior is prevented by allowing the maintained latency information for all active VOQs to be updated.

In one embodiment, this adaptive probability is determined based on a weighting of the difference between the maintained longest latency and shortest latency for the VOQs of the OQ in view of the number of VOQ-IDs in the set of VOQ-IDS (e.g., the number of active VOQs) for the OQ. In one embodiment, when this difference is zero, then then all VOQ-IDs are given the same probability of being selected. In one embodiment, the adaptive probability of selecting the particular VOQ-ID is relatively higher for a larger difference, and relatively smaller for a smaller difference. In one embodiment, the adaptive probability is adjusted based to a lower value when the number of VOQ-IDS in the set of VOQ-IDs is relatively high, and to a higher value when the number of VOQ-IDS in the set of VOQ-IDs is relatively low.

As determined in processing block 545, if the particular VOQ-ID identified as having the longest latency is to be scheduled based on a comparison operation between the determined adaptive probability and a generated random number, then processing proceeds to processing block 546; otherwise, processing proceeds to processing block 548.

Continuing in processing block 546, the particular VOQ-ID is set to the currently maintained VOQ-ID having the longest latency. Processing proceeds directly to processing block 550.

Continuing in processing block 548, one of the active VOQ-IDs for the OQ is randomly selected as the particular VOQ-ID, possibly using a weighted random selection based on maintained latency information for the VOQs of the OQ. Processing proceeds to processing block 550.

Continuing in processing block 550, a packet entity, corresponding to the particular VOQ-ID, is requested and transmitted from the corresponding VOQ such as per processing blocks 370-372 of FIG. 3E. As determined in processing block 555, if the VOQ corresponding to the particular VOQ-ID is empty (e.g., as a result of processing block 550), then processing proceeds to processing block 556; otherwise, processing proceeds directly to processing block 559.

Continuing with processing block 556, the particular VOQ-ID is removed from the list of the active VOQ-IDs of the OQ, and possibly some latency information is updated (e.g., the VOQ-ID identified as corresponding to the longest and/or shortest VOQ for the OQ).

Continuing with processing block 559, processing of the flow diagram of FIG. 5B is complete.

In view of the many possible embodiments to which the principles of the disclosure may be applied, it will be appreciated that the embodiments and aspects thereof described herein with respect to the drawings/figures are only illustrative and should not be taken as limiting the scope of the disclosure. For example, and as would be apparent to one skilled in the art, many of the processing block operations can be re-ordered to be performed before, after, or substantially concurrent with other operations. Also, many different forms of data structures could be used in various embodiments. The disclosure as described herein contemplates all such embodiments as may come within the scope of the following claims and equivalents thereof.

What is claims is:

1. A method comprising:
   receiving a plurality of packets for a first output port of a switch;
   for each respective Virtual Output Queue (VOQ) of a plurality of VOQs associated with the first output port, enqueueing a corresponding subset of the plurality of packets in the respective VOQ;
   determining a latency value associated with each respective VOQ, the latency value indicative of a difference between a current time and an enqueue time of a packet in the respective VOQ;
   determining an adaptive probability value based on one or more of the latency value associated with an oldest VOQ of the plurality of VOQs or the latency value associated with a youngest VOQ of the plurality of VOQs; and
   transferring one or more packets from a selected VOQ of the plurality of VOQs to an output queue corresponding to the first output port, wherein the selected VOQ is selected based on the adaptive probability value by:
      selecting the oldest VOQ based on generating a random value less than or equal to the adaptive probability value; or
      randomly selecting a VOQ of the plurality of VOQs based on generating a random value greater than the adaptive probability value.

2. The method of claim 1, wherein the plurality of VOQs are associated with the output queue corresponding to the first output port.

3. The method of claim 1, wherein the selected VOQ is the oldest VOQ, and wherein the oldest VOQ is associated with a highest latency value of the plurality of VOQs.

4. The method of claim 1, wherein determining the latency value associated with each respective VOQ comprises:
   determining a difference between a current timestamp and an enqueue timestamp of a packet located at the head of the respective VOQ.

5. The method of claim 1, wherein:
   each respective VOQ of the plurality of VOQs maintains a first-in-first-out (FIFO) queue for the corresponding subset of packets; and
   each packet of the corresponding subset of packets stored is associated with an enqueue timestamp, each enqueue timestamp indicative of a system time when the packet was written to the respective VOQ.

6. The method of claim 1, wherein:
   each VOQ of the plurality of VOQs is associated with the output queue;
   each VOQ enqueues a disjoint subset of the plurality of packets; and
   the plurality of VOQs are configured to emulate a first-in-first-out (FIFO) behavior corresponding to enqueueing the plurality of packets directly in the output queue.

7. The method of claim 1, wherein transferring one or more packets from the selected VOQ to the output queue comprises:
   transferring a packet at the head of the selected VOQ to the output queue, wherein the packet at the head of the selected VOQ is an oldest packet in the selected VOQ.

8. The method of claim 7, wherein transferring one or more packets from the selected VOQ to the output queue further comprises:
   transferring a quantity of additional packets stored in the selected VOQ to the output queue, wherein the additional packets are stored in the selected VOQ below the packet at the head.

9. The method of claim 8, wherein the quantity of additional packets transferred is less than or equal to a threshold quantity.

10. A system comprising:
    one or more processors; and
    at least one computer-readable storage medium having instructions stored thereon, wherein the instructions, when executed by the one or more processors, are effective to cause the one or more processors to:
       receive a plurality of packets for a first output port of a switch;
       for each respective Virtual Output Queue (VOQ) of a plurality of VOQs associated with the first output port, enqueue a corresponding subset of the plurality of packets in the respective VOQ;

determine a latency value associated with each respective VOQ, the latency value indicative of a difference between a current time and an enqueue time of a packet in the respective VOQ;

determine an adaptive probability value based on one or more of the latency value associated with an oldest VOQ of the plurality of VOQs or the latency value associated with a youngest VOQ of the plurality of VOQs; and transfer one or more packets from a selected VOQ of the plurality of VOQs to an output queue corresponding to the first output port, wherein the selected VOQ is selected based on the adaptive probability value, and wherein the instructions cause the one or more processors to:

select the oldest VOQ based on generating a random value less than or equal to the adaptive probability value; or randomly select a VOQ of the plurality of VOQs based on generating a random value greater than the adaptive probability value.

11. The system of claim 10, wherein the plurality of VOQs are associated with the output queue corresponding to the first output port.

12. The system of claim 10, wherein the selected VOQ is the oldest VOQ, and wherein the oldest VOQ is associated with a highest latency value of the plurality of VOQs.

13. The system of claim 10, wherein, to determine the latency value associated with each respective VO, the instructions cause the one or more processors to:

determine a difference between a current timestamp and an enqueue timestamp of a packet located at the head of the respective VOQ.

14. The system of claim 10, wherein:

each respective VOQ of the plurality of VOQs maintains a first-in-first-out (FIFO) queue for the corresponding subset of packets; and each packet of the corresponding subset of packets stored is associated with an enqueue timestamp, each enqueue timestamp indicative of a system time when the packet was written to the respective VOQ.

15. The system of claim 10, wherein:

each VOQ of the plurality of VOQs is associated with the output queue;

each VOQ enqueues a disjoint subset of the plurality of packets; and the plurality of VOQs are configured to emulate a first-in-first-out (FIFO) behavior corresponding to enqueueing the plurality of packets directly in the output queue.

16. The system of claim 10, wherein, to transfer one or more packets from the selected VOQ to the output queue, the instructions cause the one or more processors to:

transfer a packet at the head of the selected VOQ to the output queue, wherein the packet at the head of the selected VOQ is an oldest packet in the selected VOQ.

17. The system of claim 16, wherein, to transfer one or more packets from the selected VOQ to the output queue, the instructions further cause the one or more processors to:

transfer a quantity of additional packets stored in the selected VOQ to the output queue, wherein the additional packets are stored in the selected VOQ below the packet at the head, and wherein the quantity of additional packets transferred is less than or equal to a threshold quantity.

18. A non-transitory computer-readable medium including instructions which, when executed by one or more processors, cause the one or more processors to:

receive a plurality of packets for a first output port of a switch;

for each respective Virtual Output Queue (VOQ) of a plurality of VOQs associated with the first output port, enqueue a corresponding subset of the plurality of packets in the respective VOQ;

determine a latency value associated with each respective VOQ, the latency value indicative of a difference between a current time and an enqueue time of a packet in the respective VOQ;

determine an adaptive probability value based on one or more of the latency value associated with an oldest VOQ of the plurality of VOQs or the latency value associated with a youngest VOQ of the plurality of VOQs; and transfer one or more packets from a selected VOQ of the plurality of VOQs to an output queue corresponding to the first output port, wherein the selected VOQ is selected based on the adaptive probability value, and wherein the instructions cause the one or more processors to:

select the oldest VOQ based on generating a random value less than or equal to the adaptive probability value; or randomly select a VOQ of the plurality of VOQs based on generating a random value greater than the adaptive probability value.

19. The non-transitory computer-readable medium of claim 18, wherein the selected VOQ is the oldest VOQ, and wherein the oldest VOQ is associated with a highest latency value of the plurality of VOQs.

20. The non-transitory computer-readable medium of claim 18, wherein:

each VOQ of the plurality of VOQs is associated with the output queue;

each VOQ enqueues a disjoint subset of the plurality of packets; and the plurality of VOQs are configured to emulate a first-in-first-out (FIFO) behavior corresponding to enqueueing the plurality of packets directly in the output queue.

* * * * *